MEANS FOR CONVERTING AN INPUT TO MECHANICAL OUTPUT CONTROL

Filed Aug. 10, 1959 3 Sheets-Sheet 1

INVENTOR.
JOSEPH T. McNANEY.
BY
Carl R. Brown
ATTORNEY.

July 16, 1963 J. T. McNANEY 3,098,223

MEANS FOR CONVERTING AN INPUT TO MECHANICAL OUTPUT CONTROL

Filed Aug. 10, 1959 3 Sheets-Sheet 2

INVENTOR.
JOSEPH T. McNANEY.
BY Carl R. Brown
ATTORNEY.

July 16, 1963 J. T. McNANEY 3,098,223

MEANS FOR CONVERTING AN INPUT TO MECHANICAL OUTPUT CONTROL

Filed Aug. 10, 1959 3 Sheets-Sheet 3

INVENTOR.
JOSEPH T. McNANEY.
BY Carl R. Brown
ATTORNEY.

United States Patent Office 3,098,223

Patented July 16, 1963

3,098,223 MEANS FOR CONVERTING AN INPUT TO MECHANICAL OUTPUT CONTROL

Joseph T. McNaney, La Mesa, Calif., assignor to General Dynamics Corporation, Rochester, N.Y., a corporation of Delaware Filed Aug. 10, 1959, Ser. No. 832,754
8 Claims. (Cl. 340—347)

The present invention relates generally to means which convert an input to mechanical output control. More specifically the invention relates to a system capable of converting code groups, such as binary language commands, into mechanical positioning of an output device or means.

Industrial machinery is frequently designed to respond to coded commands from hydromechanical or mechanical sources, as well as electronic computers or from storage media such as magnetic tape. To effect control of machinery, numeric designation systems, electromechanical typewriters and the like, the binary language may be used among others. Ordinarily such language is first translated from digital into analogue form and then converted into mechanical output motion or force. Digital-to-analogue converters, however, are usually complex mechanical or electromechanical devices. The components of such converters are usually machined to a high degree of accuracy for minimal lost motion and reduction of amplification of error within the equipment. Furthermore, it is a well established axiom that reliability and operating efficiency generally suffer with increasing complexity. The instant invention overcomes such complexity by simplification thereof. The simplified code group-to-anologue converter hereinafter described makes possible simplified computer control of many industrial processes, with resultant increases in operating speed and efficiency.

In the field of graphic arts, for example, a revision of typesetting and printing methods is urgently needed. Typesetting machines and photoprinters which have evolved from the original linotype machine are large, elaborate, complex, expensive and relatively slow. An example of an industrial need is the need for high speed, high quality, automatic addressing means; such addressings would aid major publishing houses in overcoming the presently imposed limit on their circulation capabilities. The input to mechanical output control converter or system of my invention answers such needs and may be used to provide the desired output control.

It is an object of this invention to provide an input to mechanical output control converter which may be small in size and light, simple, reliable, relatively inexpensive, accurate, efficient, easy to fabricate and assemble, and devoid of complex moving parts in its construction.

It is another object of the invention to provide a new and improved mechanism to convert binary digital information into analogue equivalents.

It is another object of the invention to provide a system for actuating machines or processes requiring the expenditure of power, which with rapidity and small power requirements responds to binary digital commands.

It is another object of the invention to provide a system which simply and efficiently positions a character matrix in the path of a light beam as directed by electrical binary digital inputs.

It is another object of the present invention to provide a simple and trouble free device to control, by mechanical movement, an output device in response to digital code group input.

It is another object of the invention to provide a linear movement for output control in response to electrical binary code groups, which linear movement may be a combination of independent displacements generated by several of the code groups to cause a composite linear movement to control the output device.

It is another object of the invention to provide a relatively high speed system capable of responding to electrical digital code groups for translating the code groups into discretely controlled linear movement for output control.

Objects and advantages other than those set forth above will become apparent when read in connection with the accompanying specification and drawings in which.

Figure 6:
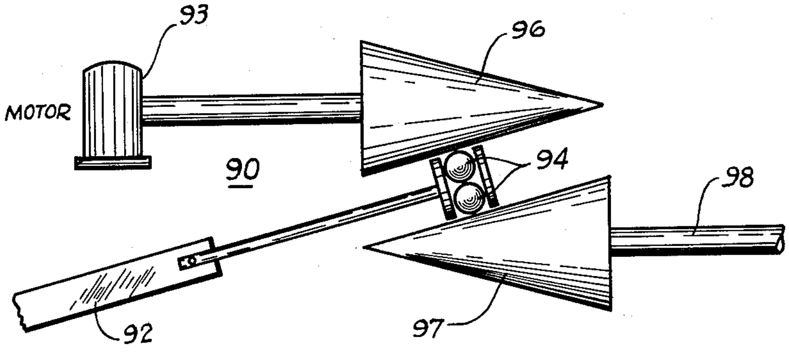
Figure 7:
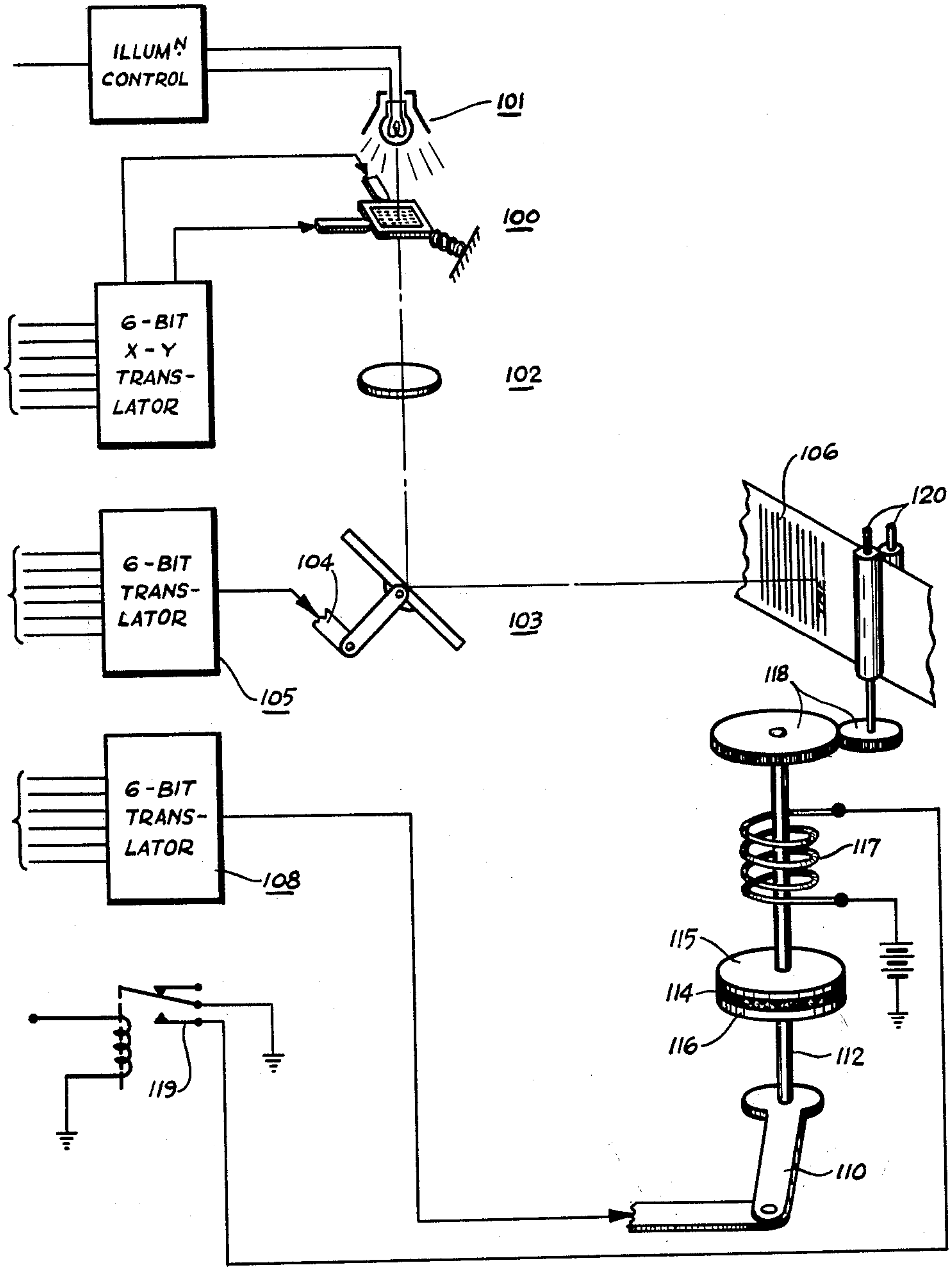

FIGURE 6 is a schematic representation of a mechanical control system as an output means, wherein the invention is utilized to adjust the rotational speed of a power output shaft in response to binary digital commands; and FIGURE 7 is a schematic representation of a composite system utilizing the above described inventive embodiments to print text and similar material on a recording medium in response to binary digital code commands.

The instantaneous energy state at each output terminal of a binary device, be that device mechanical or electrical, or both, is designated in the computer art as a bit. A binary bit includes the existence of one of two possible energy states at its output terminal. A command is designated as the information contained in the form of binary energy levels in a combination of two or more binary bits. Two binary bits provide four commands; three binary bits, eight commands. In general the number of commands attainable are shown as follows:

$$N=2^a$$

where $a$=the number of binary bits, and $N$=the number of commands.

Figures 1, 2, 3:
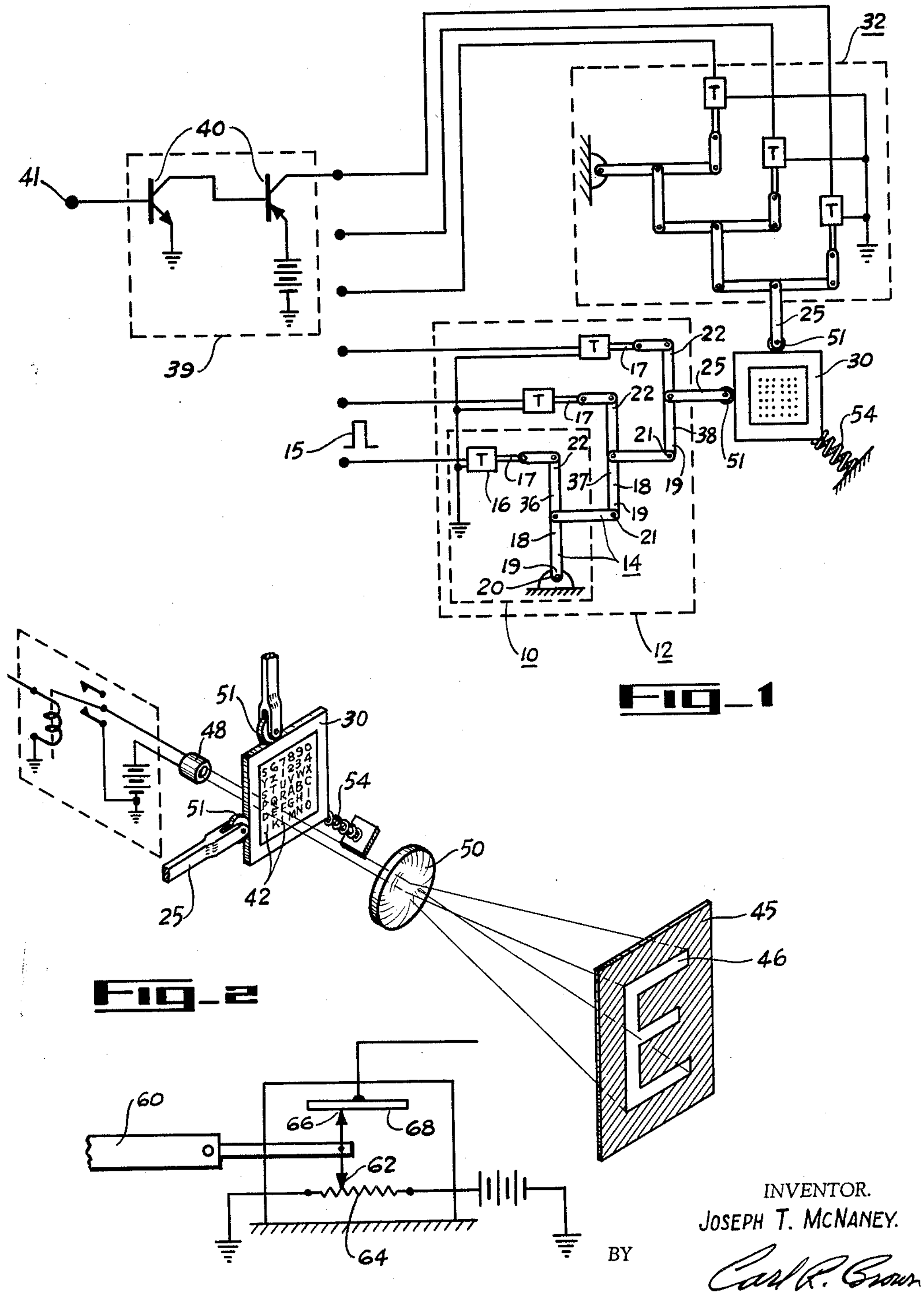
FIGURE 1 is a diagrammatic showing employing the inventive embodiment wherein the output means is a character matrix responsive to the converted six binary digital bits of matrix position.
FIGURE 2 is a view partly diagrammatic and partly in perspective showing the light illumination of the matrix wherein an exemplary character of the matrix has been illuminated and projected.
FIGURE 3 is a schematic representation of an output means wherein binary digital codes are translated into discrete analogue voltage equivalents.

Referring to FIGURE 1, there is generally shown therein a complete system for producing linear movement either of an individual or a composite linear movement to position for example a matrix in an X and a Y coordinate thereby selecting one of its characters to be illuminated by a light beam. The means for converting an input to a mechanical control is basically shown by the block 10. Several of these means utilized together to provide a composite output control are shown generally by the block 12 wherein a plurality of linkage means 14 is utilized.

The rudimentary and basic converting means is shown by the block 10. In means 10 an input signal 15 may be supplied to a transducer means 16 for conversion by the transducer means from electrical into mechanical motion at its output 17. Transducer means 16 may utilize any of a group of well known means which are capable of receiving an input signal and converting the input signal to mechanical motion. Such transducer means for use in electrical systems may include solenoids, relays, or piezoelectric crystals and in nonelectrical signal means may include mechanical push buttons or hydromechanical plungers (not shown). An electrical solenoid is exemplarily shown herein as the transducer means.

A mechanical motion produced by the output 17 of the transducer means 16, in response generally to the input code or signal 15, is then utilized by a linkage means 14. Linkage means 14 comprises basically a solid bar or lever 18, and has one of its extremities 19 in pivotal engagement with a pivot point 20. The pivot point 20 may either be a fixed pivot point or may be a movable pivot point permitting rotational movement and translation or linear movement. For purposes of exemplification, pivot point 20 is fixed and pivot point 21 is movable in linear translation and pivoting. The motion of the extremity 19 of the bar 18 basically is a rotation or pivoting of the bar about the pivot point 20 or 21, upon the urging thereof at its opposite extremity 22 by the output 17 of the transducer 16. Pivot point 21 serves the same function as the pivot point 20 but permits, in addition, a translatory action in response to the linear motion of the bar 18 under the urging of the transducer output 17.

Link 25 is in pivotal engagement with the bar 18 intermediate its one extremity 19 and its other extremity 22, and is shown for exemplification as being approximately midway between extremities 19 and 22 of the bar 18. The function of link 25, upon the receipt of mechanical motion from the transducer 16 at its output 17 as applied to the other extremity of bar 18 and 22, causing the bar 18 to be pivoted at its pivot point, either 20 or 21, at its extremity 19, is to transmit an output movement developed at the link 25. Link 25 provides the desired output movement. This output movement is preferably a linear movement, and, depending upon the position of the link 25 intermediate the extremities 19 and 22, the movement is proportional to the transducer means output 17.

As the lever or bar 18 and the link 25 are in motion transmitting engagement one with the other, and activated by the transducer 16, they move generally in one plane of operation or movement. Therefore, to describe the static condition of the arrangement of the levers or bars 18 and the links 25, they are essentially rectangular one with the other. That is, the links connect at approximately a 90 degree angle with the levers as exemplified in FIGURE 1. Therefore, in the exemplary showing, for instance, the output or mechanical motion 17 of the transducer 16 transmitted to the bar 18 at its extremity 22, causes the bar 18 to pivot about its pivot point 20 or 21. As the link 25 is approximately midway between the extremities 19 and 22 of the bar 18, about one-half of the mechanical motion urged against extremity 22 of bar 18 will be transmitted as a linear or an output movement by link 25. Of course link 25 may be the final output to the device being actuated thereby, but is shown in the exemplary showing as connected to successive extremities 19 of other successive bars 18. Therefore, the basic linkage means 14 may be utilized together with other linkage means, one linkage means being provided for each bit of information with which it is desired to control the linear output movement. The linear output movements of course are displacements essentially linearly directed, which movements are of a rather low magnitude compared with the length of the levers 18. Although not shown, it is possible to place the link 25 in a channel or guide and makes its connection to link 38 pivotal to direct its motion to be purely linear.

The basic means for converting an input to a mechanical control is shown as 10. Means 10 includes the transducer 16, its output 17, and the linkage means 14. Means 10 lends itself quite readily to combining with successive and additional of such converting means 10, one each for each particular bit of information which it is desired to be joined with other information to effect, selectively, a single or a composite output movement or linear movement. It can readily be seen that through the application of a high level bit of information at 15, the transducer 16 is actuated to cause mechanical motion of the output 17 to the linkage means 14. Link 25 provides resulting linear movement which may be transmitted from the successive bar 18 to effect an end output displacement upon the exemplary matrix 30 through roller 51 and against compression spring 54 shown herein. It should be noted that while the link 25 pivots with respect to each of the bars 18, its prime function is to convert the mechanical motion transmitted by transducers 16 to the bar 18 at 22, into a linear movement at link 25. Link 25 thereafter effects at its opposite extremity of the link, i.e., where link 25 engages the next bar 18, a linear displacement of the pivot point 21 of that successive or additional bar 18 thereby displacing in turn its suspended link 25, and the successive bar and link a correspondingly proportional displacement. The displacement results in an output or linear movement to control the output means exemplified herein as the matrix 30. While the plurality (or three means) of these means 10 is shown as 12, three were chosen for exemplification so that three bits of code information could be used to actuate the output means, the matrix 30, in an X position, and a further like plurality of these means 10, shown by block 32, is utilized to give the matrix a Y position, all, of course, positioning the matrix in one plane of movement.

In the exemplary showing, utilizing three conversion means 10, for each axis, X and Y, is demonstrated the use of six bits of information to position an 8 character by 8 character matrix array in selected X and Y positions. Relating back to the necessary number of commands, where N is the number of commands, and A is the number of binary bits, the commands are equal to $N=2^6$. Therefore, 6 binary bits of information result in 64 possible positions, or 64 discrete analogue output or linear movement combinations. To further exemplify this, let us assume that a one unit displacement of the first lever 36 is effected, and that its link 25 is approximately midway between its extremities 19 and 22. The linear movement transmitted to the second lever 37 by the first link 25 would effect a one-half unit displacement of the extremity 19 adjacent to the point 21 of second lever 37. Second lever 37 responds to provide, at its link 25, a quarter unit displacement of linear movement which its link 25 transmits to the third lever 38. Third lever 38 in turn provides, as its output at its link 25, a one-eighth unit displacement of its link 25 to move the output means, here exemplified as the matrix 30, one-eighth unit from its initial, at rest or starting position.

Of course, the addition of added motion by any one of the linkage means 10 in its various combinations (using three linkage means) provides a total of eight discrete positions along the X axis. Similar conversion means 32 may then be employed to effect displacement along the Y axis also in eight places. Therefore, six bits of information control the output means, here exemplified as a matrix 30, in 64 discrete positions from its initial or at rest position.

The original signals or bits may be applied to the conversion means 12 or 32 through an input 41 and an amplifier 39, employing, for example, transistors 40, generally in the manner exemplified in FIGURE 1. Each input 41 may be connected through its amplifier 39 to provide high level input pulse 15 or no pulse low level condition. Amplifier 39 is exemplarily connected to only one input through which signals, code or pulses 15 are provided. Input 41 is connected first to the base emitter of a common emitter NPN transistor 40 wherein its collector is directly coupled to the base emitter of a common emitter PNP transistor 40. Through such utilization of transistors 40, considerable power amplification may be achieved of weak inputs at 41. The showing exemplifies as the source of bias power, the application of positive potential from an exemplified battery. The battery is connected between ground and a lead connecting to the emitter of the one transistor power amplifier. The current from the battery flows from the separate collector circuit of the transistor power amplifier in accordance with the incoming code to actuate the electrically connected corresponding solenoid of the transducer 16.

Further exemplification of the versatility of the invention is shown by several exemplified output means utilizing the matrix 30 as output means. FIGURE 2 shows in detail how the complete system utilizing such a positioned matrix under the influence of the composite converting means 12 is utilized. The matrix 30 presents characters 42 formed therein. The characters 42 should preferably be of the translucent type, to permit either shadowing or forming of the light images for further projection of the character 42 onto a screen 45 as a display character 46 thereon. The matrix 30 therefore may be positioned in the path of light emanating from a light source 48. Light source 48 is controllable in on or off condition and is capable of selectively illuminating at least one of the characters 42 in matrix 30 at a time. The resulting character shaped light beam may be collimated by a lens 50 to provide upon the screen 45 a finally projected image 46 of the illuminated character 42. The matrix 30 may be resiliently biased by a compression spring 54 to an initial, at rest or starting position. Of course, a light receptive and responsive surface, here exemplified as a screen 45, could also be any recording paper, selenium plate or the like, to record the light images and still be within the ambit of the present invention.

Other output means can also be effectively utilized to respond to an electrical or other input, causing desired corresponding control of an output means thereto. FIGURE 3 is an exemplification of an additional such output means shown therein as a stepped linear potentiometer. The fragmentary link 60 (similar to the output link 25 as shown in FIGURE 1) may be actuated in response to the input code to give controlled linear output movement to step the contacts 62 along a linear potentiometer 64, thereby providing at its contact 66 along the output plate 68 a stepped analogue output voltage in response to the digital input code.

Figure 4:
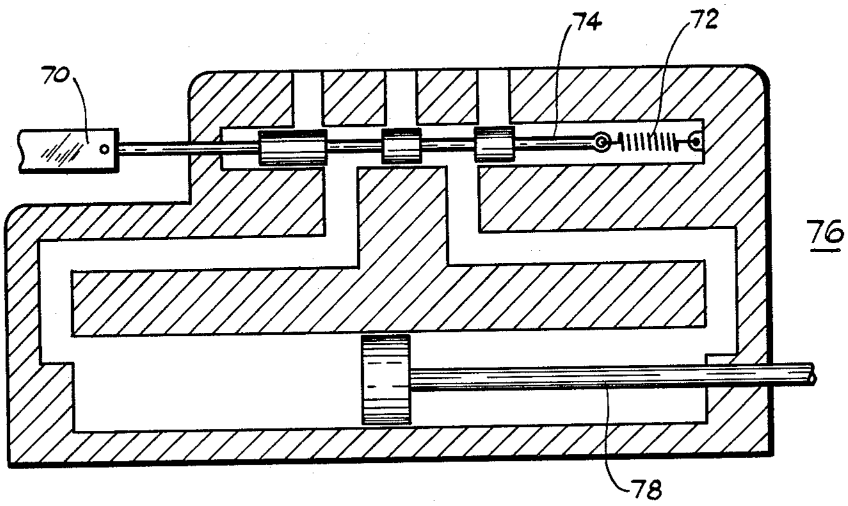
FIGURE 4 is a schematic representation of a hydraulic system as an output means wherein the invention is utilized to control the rate of displacement of output actuators in accordance with binary digital commands.

FIGURE 4 shows another output means capable of being discretely positioned by the plurality of linkage means 14, through the application of the linear movement at the link 70. The linear movement of link 70 operates against a resilient means 72 of the hydraulic actuator 74 so as to effect control of the hydraulic valve, generally shown as 76. Such control, of course, is effected by discrete positioning of actuator 74 to provide the proper ingress and egress of hydraulic fluid which fluid in turn actuates the power actuator 78.

Figure 5:
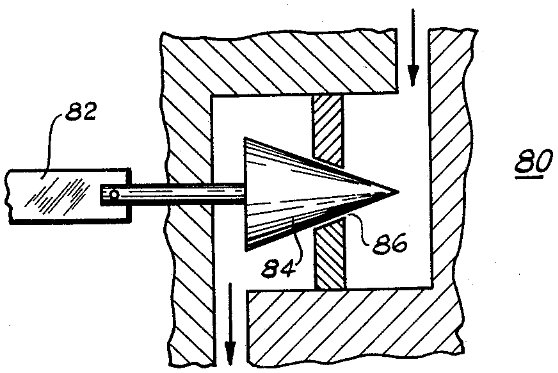
FIGURE 5 is a schematic representation of a hydraulic or pneumatic system as an output means wherein the invention is utilized to control the rate of flow of a fluid in accordance with binary digital commands.

Another exemplary showing of an output means capable of responding to digital signals to control it through the converter means 10 is shown in FIGURE 5, as a fluid flow control valve 80. The fluid flow control valve 80 is actuated by the link 82 in response to the converter means 10 or plurality thereof 12, or more, in order to discretely position the cone 84 in the orifice 86, permitting limited liquid flow therebetween in a predetermined amounts as determined by bits of said code or signals.

FIGURE 6 exemplifies an output means under the control of the converter means 10 or plurality thereof 12, or more, at the link 92 of a ball and cone speed changing assembly 90. The ball and cone speed changing assembly 90 is controlled by discrete positioning of the link 92 under the influence of the converter means 10. In response to bits of information, link 92 moves the balls 94 along the surfaces of the complementarily presented cones 96, 97 to transmit power therebetween. The axes of the cones 96, 97 are parallel. A constant speed driving means, such as an electric motor 93, for example, supplies power through its shaft, to the driving cone which in turn frictionally engages the balls 94 and subjects them to lateral pressure to transmit power from the driving cone 96 to the driven cone 97, thereby delivering an output to the driven cone shaft 98 in accordance with the position of the balls 94. The linear position of the balls 94, of course, determines the ratio of driving to driven radii, and thus determines the angular speed of the driven cone as it rotates output shaft 98. Of course, the output shaft 98 may be connected to machinery, such as the drive screw of a lathe or other like discretely controlled driven machinery (not shown) to provide a rotational speed which is adjusted in accordance with commands of the input.

A further overall system concept utilizing a plurality of converter means 10 is shown in FIGURE 7. In FIGURE 7 there is shown the discrete positioning of a matrix arrangement (similar to that exemplified in FIGURES 1 and 2 of the drawings) shown by the composite numeral 100, under the command of a six bit X–Y translator. A six bit X–Y translator includes composite converter means 12 and 32. The illumination may be furnished as shown in FIGURE 2, and here exemplified by the numeral 101, to illuminate the selected character. A lens 102 may then be utilized to project the optical image of the selected character onto the surface of a pivotally positionable mirror 103.

The mirror 103 may be discretely arcuately positioned under the command of the six bit translator 105. The mirror is arcuately rotated step by step to position successive characters side by side along a line on a recording media 106. When the line is complete the mirror returns to its starting point to begin the next line. The linear output displacements on the link 104 are transmitted to one extremity of a crank of the mirror-moving device. A crank is defined herein as a rigid member pivoted near one extremity and attached rigidly to a shaft at the other extremity for the purpose of converting translation of a pivotally connected link into rotation of the output shaft. Therefore actuation of the crank will cause pivotal rotation of the mirror 103 in response thereto. Pivotal rotation of the mirror 103 will position the character in successive positions along the line on the recording medium 106. The character reflected by the mirror is then arranged upon the recording medium 106 which may be a paper capable of being sensitized by light. The characters are recorded thereon in lineal arrangement across the paper. A further six bit translator 108 may be utilized to discretely position a clutch crank 110, to effect engagement and disengagement of a clutch drive shaft 112 of a magnetically controlled clutch 114. Clutches such as this are well known in the art and commercially available. Such clutch construction is used here merely to exemplify the manner of controlling it as an output means in response to translator 108. As is well known, the output of driven plate 115 of the magnetic clutch 114 may be spring-loaded (not shown) to maintain it normally in tight contact with the driving plate 116, and may be disengaged therefrom through externally applied signals by a solenoid 117 under the influence of an exemplary switch 119. The output shaft of the clutch may be used to drive gears 118 which in turn will drive rollers 120. Rollers 120 are used to move the recording medium or paper 106 therebetween, under the command of the translator 108, in a line-at-a-time advancing motion.

As can readily be seen, such an overall system as shown in FIGURE 7 utilizing several embodiments of the invention in its various adaptable outputs permits the utilization of the system in modern high-speed printing capabilities, giving variation of character intervals, spacing, line justification, and the necessary functions needed in the printing business.

Although several embodiments of this invention have been illustrated and described with a degree of particularity, it is to be understood that the present disclosure merely sets forth exemplary embodiments of the invention. Numerous equivalents and changes in the details of construction of exemplifications and in the combination and arrangement of the parts, may be resorted to without departing from the spirit and scope of the invention as hereinafter claimed.

I claim:

1. A system responsive to a group of N binary signals to produce composite linear output movement of an output means in accordance with the information contained in said binary signals comprising a plurality of N transducer means, each of which is responsive to a signal representative of binary one applied thereto to produce a discrete linear output movement at its output; means for applying individual ones of said N binary signals to a corresponding one of said N transducer means; a plurality of N linkage means each of which comprises a lever and a link pivotally connected to the midpoint of said lever, each of said levers being of equal length; means for connecting one extremity of each lever to the output of the associated one of said transducer means; means for pivotally connecting the other extremity of the lever of the first linkage means to a fixed point; and means for connecting the other extremities of the levers of the second through the $N^{th}$ linkage means to the link of the immediately preceding one of said linkage means; output means; means for linearly moving said output means in response to the linear movement of the link of said $N^{th}$ linkage means; and means for resiliently biasing said output means against the linear movement imparted by said $N^{th}$ linkage means to thereby produce composite linear movement of said output means a distance representative of the information contained in said group of binary signals.

2. The combination of claim 1 in which said linear moving means comprises a roller in rolling contact with a surface of said output means.

3. The system in accordance with claim 1 in which the output means includes a stepped linear potentiometer, said potentiometer being operatively connected to the link of said $N^{th}$ linkage means to provide stepped analogue output voltages.

4. The system in accordance with claim 1 in which the output means includes a hydraulic actuator of a hydraulic valve.

5. The system in accordance with claim 1 in which the output means includes a fluid flow control valve.

6. The system in accordance with claim 1 in which the output means includes a ball and cone speed changing assembly.

7. A system responsive to a first and second group of N binary signals to respectively produce composite linear output movement of an output means in an X and Y direction in accordance with the information contained in said groups of binary signals comprising a first and second plurality of N transducer means, said transducer means of said first and second plurality being responsive to a signal representative of a binary one applied thereto to produce a discrete linear movement at each output; means for applying individual ones of said N binary signals of said first and second groups respectively to corresponding ones of said N transducer means of said first and second plurality; first and second pluralities of N linkage means each of which comprises a lever and a link pivotally connected to the midpoint of said lever, each of said levers being of equal length; means for connecting one extremity of each lever of said first and second plurality of linkage means respectively to the output of the associated one of said transducer means of said first and second plurality of transducer means; means for connecting the other extremities of each lever of the first linkage means of said first and second plurality of linkage means to fixed points; and means for connecting the other extremities of the levers of the second through the $N^{th}$ linkage means of said first and second plurality of linkage means respectively to the link of the immediately preceding one of said linkage means; an output means; means for linearly moving said output means in an X and Y direction respectively in response to the linear movement of the links of said $N^{th}$ linkage means of said first and second plurality; and means for resiliently biasing said output means against the linear movement imparted by said $N^{th}$ linkage means of both said first and second plurality of linkage means to thereby produce composite linear movement of said output means in both an X and Y direction a distance representative of the information contained respectively in said first and second groups of binary signals.

8. The combination of claim 7 in which said output means comprises a matrix, and a fixed source of light, said matrix having a plurality of light apertures arranged in a Cartesian coordinate pattern, the light from said source irradiating only an area of said matrix sufficient to irradiate one aperture at a time, the spacing between said apertures being equal to the amount of matrix movement caused by the application of a signal representative of binary one to the transducer means associated with said first linkage means of either said first or second plurality of linkage means.

References Cited in the file of this patent

UNITED STATES PATENTS 1,938,899 Gilman ---------------- Dec. 12, 1933

OTHER REFERENCES

Mechanics for Practical Men, Jamison, London, 4th edition. The Third Treatise, p. 9 et seq.